E. H. McFARLAND.
NOZZLE PLUG.
APPLICATION FILED MAR. 29, 1916.
1,255,622.
Patented Feb. 5, 1918.
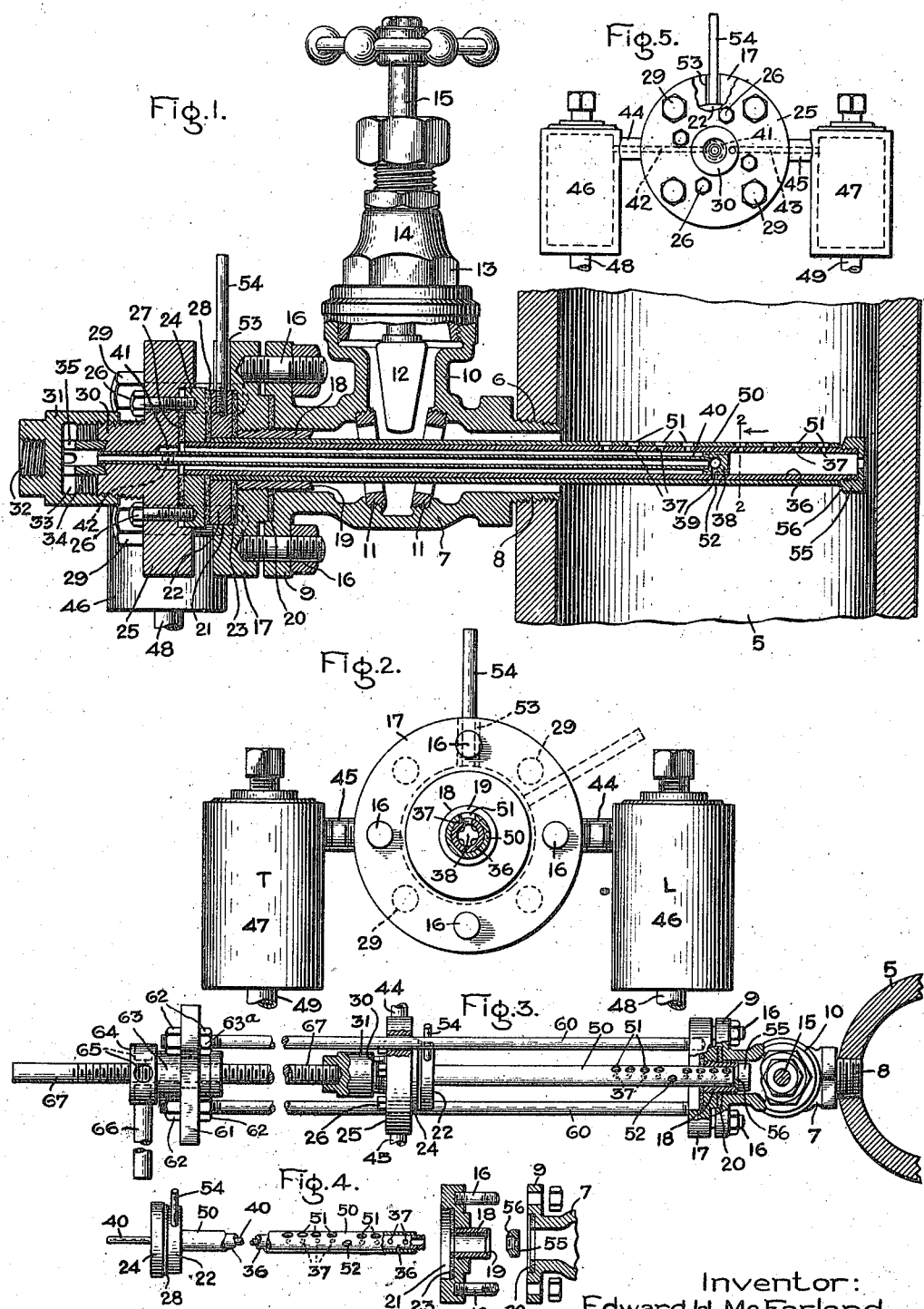
Inventor:
Edward H. McFarland,
by Albert H. Davis
His Attorney.

ered opening into which is
UNITED STATES PATENT OFFICE.

EDWARD H. McFARLAND, OF BOSTON, MASSACHUSETTS, ASSIGNOR TO GENERAL ELECTRIC COMPANY, A CORPORATION OF NEW YORK.

NOZZLE-PLUG.

1,255,622.  Specification of Letters Patent.  Patented Feb. 5, 1918.

Application filed March 29, 1916. Serial No. 87,606.

*To all whom it may concern:*

Be it known that I, EDWARD H. McFARLAND, a citizen of the United States, residing at Boston, county of Suffolk, State of Massachusetts, have invented certain new and useful Improvements in Nozzle-Plugs, of which the following is a specification.

The present invention relates to nozzle plugs or Pitot tubes, such as are used in flow meters for measuring the flow of fluids. In use under certain conditions, as when impure fluids are being measured, such plugs are liable to become stopped up and it is necessary to clean them, and when this cannot be effected by blowing them out, *i. e.* by blowing steam or air under pressure through them, or otherwise, it then becomes necessary to remove them from the conduit in which they are installed.

The object of the present invention is to provide an improved nozzle plug in which the tubes which have the orifices can be removed from the main or conduit without requiring that the fluid flowing through it be shut off; *i. e.* one in which they can be removed and reinserted while the main or conduit is under pressure.

For a consideration of what I believe to be novel and my invention, attention is directed to the accompanying specification and the claims appended thereto.

In the accompanying drawing, Figure 1 is a longitudinal section through a nozzle plug embodying my invention, the same being shown in place in a conduit; Fig. 2 is an end view of the plug looking toward the left (Fig. 1) with the valve and the part of the base to which it is attached removed, the orifice tubes being shown in section taken on line 2—2, Fig. 1; Fig. 3 is a plan view, partly in section showing the tubes removed from the conduit and also illustrating a forcing rig for such purpose; Fig. 4 is a view showing the various parts separated and some of them partly broken away; and Fig. 5 is an end view of a part of the plug, looking toward the right, Fig. 1.

Referring to the drawing, 5 indicates a main or conduit through which the fluid to be metered flows. It is provided with a threaded opening 6 into which the base of the nozzle plug screws. The base comprises a main section 7 having a threaded nipple 8 at one end and a flange 9 at the other. On the main section 7 is an annular projection 10 forming a part of a valve casing. In the main section 7 are two spaced annular disks 11 forming between them a valve seat against which seats the valve 12. Threaded to the annular projection 10 is a cap 13 carrying a stuffing box 14 through which the stem 15 of the valve projects. This valve structure may be of any suitable design and arranged in any desired manner so that when it is turned down the valve 12 seats on the seat formed by the disks 11. Fixed to the flange 9 by bolts 16 is a disk 17 having a threaded central opening into which is screwed a short sleeve 18 having a beveled edge 19 which forms a stop. The sleeve projects into the base a short distance and between the disk 17 and the flange 9 is a suitable packing or gasket 20. The disk 17 has a recess 21 in which is located a ring 22, there being a packing 23 between it and the disk 17. The ring 22 is rotatable relative to disk 17 and is held in place by a second ring 24 fixed to a disk 25 by bolts 26, suitable packings 27 and 28 being provided between them. The disk 25 is fastened to disk 17 by a suitable number of bolts 29, for example four, and it has a threaded nipple 30 over which is screwed a cap 31, having a threaded hole 32 in its end. Between the cap 31 and the nipple 30 is a spacer member 34 having openings 35 therein. Fixed to the ring 24 is a tube 36 having the leading openings 37 therein and inside tube 36 is fastened a block 38 having the trailing orifices 39 therein. Fixed to the block 38 is a tube 40 which extends through an opening in the nipple 30 and communicates with the chamber 33 formed between the nipple 30 and the cap 31, the tube 40 making a snug fit with the opening in the nipple. It will thus be seen that the tubes 36 and 40 which are usually termed the leading and trailing tubes are fixed to and carried by the ring 24, which in turn is fixed to the disk 25. The annular space between the two tubes 36 and 40 communicates with a chamber 41 formed in disk 25 as shown in Fig. 1. The disk 25 is provided with suitable openings which communicate with chambers 33 and 41 and through which the trailing and leading pressures are taken off. 42, Figs. 1 and 5 indicates the opening leading from chamber 41, and 43, Fig. 5, the opening from chamber 33, the opening 43 comprising a radial hole in the disk 25 which is intercepted by an axial hole in the nipple 30. 44 and 45 indicate pipe sections which connect openings 42 and 43 to the reservoirs 46 and 47 from which suitable pipes 48 and 49 lead to the manometer. 50 indicates a sleeve which surrounds the tube 36 and is fastened at its end to the rotatable ring 22. It is provided with openings 51 and 52 which normally register with the leading and trailing openings 37 and 39, but which may be moved out of registry with them by turning the sleeve. The disk 17 is provided with a slot 53 in which is located a pin 54 fastened to ring 22. By oscillating the pin 54 the sleeve 50 is turned to bring the openings 51 and 52 out of and into registry with openings 37 and 39. In other words, the sleeve 50 is in substance a valve for closing off the leading and trailing openings. Threaded on to the end of the tube 36 is a cap 55 having a beveled edge 56 which is adapted to engage the beveled edge 19 on the sleeve 18 to limit the movement of the parts.

For removing and reinserting the orifice tubes, I employ a forcing rig, as shown in Fig. 3. This comprises a pair of guide rods 60 fastened at one end to a plate 61, as by means of the nuts 62, and threaded at the other end to fit the threaded openings in the disk 17 into which bolts 29 screw. In the center of the plate 61 is rotatably mounted a nut 63 having an enlarged head 64 provided with openings 65 into which an operating handle 66 may be inserted. The nut 63 may be fitted to the plate 61 in any suitable manner, it being only necessary that it be fixed against longitudinal movement, but at the same time it is permitted to turn. Preferably the nut will have an annular recess 63ª into which the edges of the opening in the plate 61 fit. Extending through the nut 63 is a threaded rod 67 of a size to fit the threads in the hole 32 in cap 31.

When it is desired to remove the tubes 36 and 40 from the conduit 5, two of the bolts 29 which are located opposite to each other are removed and the guide rods 60 inserted in their place, the ends of the guide rods being screwed into the openings in disk 17 in which the two bolts were previously threaded. The end of rod 67 is then screwed into the hole 32 in the end of cap 31. The remaining bolts 29 are then removed. The nut 64 is then turned by means of handle 66 in a direction to cause the rod 67 to pull the disk 25 to the left, Figs. 1 and 3. This will move the disk 25 which will carry with it the rings 24 and 22. As soon as the ring 22 has moved far enough from disk 17 to take the pin 54 out of slot 53, the pin is oscillated to turn the ring 22 and the sleeve 50 so as to bring the openings 51 and 52 in the sleeve 50 out of registry with the openings 37 and 39 in the tubes 36 and 40, thereby closing off the openings 37 and 39. The operation of the nut 64 is then continued until the beveled edge 56 of the cap 55 engages the end of sleeve 18, which, as before stated, forms a stop to prevent the tubes being entirely pulled out and at the same time indicates that the ends of the tubes have been pulled beyond the valve seat formed by disks 11. The valve 12 is next closed thus shutting off communication between the interior of the conduit 5 and the outer end of the main section 7 of the nozzle plug base. The bolts 16 may then be taken out permitting the tubes 36 and 40 to be entirely removed from the base section 7. The parts may then be further disassembled as found desirable and cleaned after which they are reassembled and the tubes 36 and 40 and sleeve 50 reinserted into the conduit, the steps being the reverse of those described for removing the tubes.

The forcing rig is usually necessary in removing and inserting the tubes as this would usually be done against a considerable pressure. It is to be understood, however, that the rig shown is only one means for removing the tubes, and that such tubes may be removed with any other form of rig, or if the conditions are such as to permit it, they may be removed by hand.

When the parts are in their normal positions, as shown in Fig. 1, the pin 54 rests in slot 53. The sleeve 50 is thus locked against accidental movement. The nozzle plug may in one respect be considered as comprising two main base sections which are connected together by the bolts 29, one of which base sections is fixed to the conduit and carries the valve, as 12, and the other of which is fastened to the first and carries the orifice tube or tubes. The line of division between the two sections is well illustrated in Fig. 3 wherein they are shown as having been separated by the forcing rig.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. A nozzle plug comprising a base section having a passage through it and adapted to be fixed to a conduit, a second base section, an orifice tube carried by it and extending through the passage in the first base section, means for closing off the passage through the first base section, and means carried by the second base section and operable from outside the conduit for closing the orifice or orifices in the orifice tube.

2. The combination with a conduit through which a fluid to be metered flows, of a nozzle plug comprising a base section having a passage through it, which is fixed to the conduit with the passage in communication with the conduit, a valve for closing off the passage through the base section, a second base section connected to the first section, orifice tubes carried by the second section and extending through the passage in the first section into the conduit, said tubes having a close sliding fit with the outer end of the first base section, and means carried by the second base section and operable from outside the conduit for closing the orifices in the orifice tubes.

3. The combination with a conduit through which a fluid to be metered flows, of a nozzle plug comprising a base section having a passage through it, which is fixed to the conduit with the passage in communication with the conduit, a valve for closing off the passage through the base section, a second base section connected to the first section, orifice tubes carried by the second section and extending through the passage in the first section into the conduit, said tubes having a close sliding fit with the outer end of the first base section, and a sleeve surrounding the orifice tubes and operable from outside the conduit for closing the orifices in said tubes.

4. The combination with a conduit through which a fluid to be metered flows, of a nozzle plug comprising a base section having a passage through it, which is fixed to the conduit with the passage in communication with the conduit, a valve for closing off the passage through the base section, a second base section connected to the first section, orifice tubes carried by the second section and extending through the passage in the first section into the conduit, said tubes having a close sliding fit with the outer end of the first base section, a sleeve surrounding the orifice tubes and operable from outside the conduit for closing the orifices in said tubes, and means for locking the sleeve in position.

5. In a nozzle plug, the combination of a tubular base section having a threaded nipple at one end, a valve seat in the base section, a valve for engaging it to close off the passage through said base section, a member fastened to the tubular base section, tubes having leading and trailing orifices therein carried by said member, said tubes extending through the said base section, a stop carried by the base section, and a stop carried by the tubes, said stops being so located that the tubes may be withdrawn relative to the base section until the ends of them are beyond the valve seat.

6. In a nozzle plug, the combination of a member adapted to be fixed to a conduit and having an opening through it, a second member fixed to the first member, orifice tubes carried by the second member and projecting through the opening in the first member, means carried by the second member and operable from outside the conduit for closing the orifices, and means for closing the opening through the first named member.

7. In a nozzle plug, the combination of a member that is adapted to be mounted on the main through which the fluid flows, said member having an opening through it, a valve carried by the member which is open except when the parts are removed, a second member fixed to the first, means carried by the second member which are provided with orifices, said means extending through the valve and first member into the main and a device for pulling the orifice means out of the path of the valve to permit the latter to be closed.

In witness whereof, I have hereunto set my hand this twenty-fifth day of March, 1916.

EDWARD H. McFARLAND.

Copies of this patent may be obtained for five cents each, by addressing the "Commissioner of Patents, Washington, D. C."